United States Patent [19]
Costello et al.

[11] 3,867,549
[45] Feb. 18, 1975

[54] STABLE STARCH COMPOSITIONS

[75] Inventors: Christopher H. Costello, Summit; William Carl Mende, Neshanic, both of N.J.

[73] Assignee: Colgate-Palmolive Company, New York, N.Y.

[22] Filed: June 28, 1972

[21] Appl. No.: 267,194

Related U.S. Application Data

[63] Continuation of Ser. No. 798,193, Feb. 10, 1969, , which is a continuation-in-part of Ser. No. 520,089, Jan. 12, 1966, abandoned.

[52] U.S. Cl. ............................. 424/361, 424/232
[51] Int. Cl. ........................... A61k 7/00, A61k 7/02
[58] Field of Search ..................................... 424/361

[56] References Cited
UNITED STATES PATENTS

| | | | |
|---|---|---|---|
| 2,773,068 | 12/1956 | Mannheimer | 424/333 UX |
| 2,781,356 | 2/1957 | Mannheimer | 424/273 UX |
| 2,914,442 | 11/1959 | Halpern | 424/320 |
| 3,071,514 | 1/1963 | Phillips et al. | 424/70 |
| 3,072,537 | 1/1963 | Stonehill | 424/354 |
| 3,211,563 | 10/1965 | Reed | 424/47 |
| 3,223,647 | 12/1965 | Drew et al. | 424/73 UX |
| 3,248,333 | 4/1966 | O'Roark | 252/144 |
| 3,254,121 | 5/1966 | Majewski | 260/559 |
| 3,296,145 | 1/1967 | Findlan et al. | 252/152 X |

FOREIGN PATENTS OR APPLICATIONS

| | | | |
|---|---|---|---|
| 998,507 | 7/1965 | Great Britain | 424/361 |

OTHER PUBLICATIONS

Bennett, Cosmetic Formulary, 1937, pp. 19,33,42,46,61,64,66,73.

Goodman, One Hundred Dermatologic Formulas, 1951, pp. 38 and 39.

Pascher, Dermatologic Formulary, 1957, pp. 69 and 71.

Modern Cosmeticology, Harry, 1955, pp. 600 and 601, Vol. I.

Janistyn, Reichstoffe Seifen Kosmetika, 1950, Bd. 2, pp. 379 and 380.

Sagarin Cosmetics Science and Technology, 1957, pp. 401 t0 403, 854, 855, 860 to 870.

McCutcheon, 1967, Detergents & Emulsifiers Annual, pp. 43, 44, 56, 64, 177–182 and 220.

*Primary Examiner*—Albert T. Meyers
*Assistant Examiner*—Dale R. Ore
*Attorney, Agent, or Firm*—Herbert S. Sylvester; Murray M. Grill; John J. Tomaszewski

[57] ABSTRACT

Stable, homogeneous aqueous starch lotions which contain starch, non-irritating surface active agents, a non-toxic stabilizing agent such as silicon dioxide and carboxyvinyl polymer acids and mixtures thereof. The pH of the lotions being an acid pH which coincides with the normal physiological pH of the skin.

9 Claims, No Drawings

STABLE STARCH COMPOSITIONS

This is a continuation of application Ser. No. 798,193, filed Feb. 10, 1969, which is a continuation-in-part of application Ser. No. 520,089, filed January 12, 1966, now abandoned.

This invention relates to stable aqueous starch suspensions having particular utility as starch bath lotions.

For generations, doctors have prescribed starch baths for infants, children and adults suffering with rashes, eczemas, and pruritis. The preparation of these said conventional starch baths entailed the inconvenience of pre-boiling the starch and subsequently dispersing it in the bath water. In addition to the inconvenience involved in the preparation of the starch bath, the effectiveness of said bath was minimal due to the deposition of only a small residue of starch on the body, thereby necessitating an additional dusting with dry starch. This conventional treatment of rashes or eczemas has not been improved over the years because of the insolubility characteristic of starch.

It has now been found that the disadvantages of the prior art starch baths has been eliminated by the instant novel stable aqueous lotion containing about 5 to 40 percent starch. The present starch lotion is simply added to the bath as is, or applied directly to the skin as desired. Not only is the instant novel composition simple to use, but its effectiveness is considerably enhanced due to the deposition of an emollient protective film of starch on the skin. Still another function of the instant novel starch lotion not possessed by prior art starch baths is its skin cleansing property due to the inclusion of non-irritating surface-active agents. Thus, we have found a novel starch bath lotion soap which has the dual function of cleansing the oily deposits from the skin and permitting the deposition of starch thereon in the form of an emollient, soothing protective film.

More specifically, the present invention relates to a stable aqueous starch bath lotion containing as the essential ingredients about 5-40 percent starch, 10-90 percent of an organic, nonirritating surface active agent, and about 0.1-5 percent of a stabilizing or suspending agent, all percentages being by weight of the total solids content, said lotion having a preferred pH range of about 4-6. It is preferred to add about 0.1-5 percent by weight of the total solids content of a silicone liquid to enhance the spreadability of the starch lotion. Medicaments, bacteriostatic agents, healing agents, thickening agents, perfume, etc. may be incorporated into the above lotion without adversely affecting its essential function of providing a protective layer for the treated skin.

An essential ingredient of the instant lotion is starch which is deposited on the treated skin as an emollient, soothing, protective film, said layer of starch grains being visible both to the naked eye as well as microscopically. Iodine tests on the skin treated with the instant lotion and air dried or wiped with a towel exhibited positive starch reaction, proving conclusively that a film of starch remains deposited on the treated skin. This visible protective film of starch is neither tacky nor greasy and the skin does not feel clammy or wet after the application or treatment with our lotion. On the contrary, the discomfiture of pruritis, rashes, or eczemas are relieved. The starch utilized in our lotion may be in the form of natural or ordinary starch such as corn, wheat, potatoe, and the like or may be a starch derivative such as Dry-flo, Vulca, formaldehyde-treated starch, epichlorohydrin-treated starch, etc. The amount of starch should be sufficient to leave an effective layer thereof on the treated skin. It has been found that starch in amounts of about 5–40 percent by weight of the solid content and preferably 20–25 percent by weight of the aqueous lotion is necessary in order to effect the desired result.

The cleansing action of the lotion is supplied by one or more suitable non-irritating surface active agents selected from the class consisting of anionic, cationic, non-ionic and amphoteric compounds in concentrations of about 10–90 percent, by weight of the solid content and preferably 20–60 percent by weight of the aqueous lotion.

A preferred group of surface active agents are the fatty acid amides of protein hydrolysates represented by the formula: RCON(H) peptide COOM wherein R is an alkyl radical containing from 8 to 18 carbon atoms, and M is a cation such as ammonium, magnesium, alkali metals, alkanol-amine (i.e., mono-di-, triethanolamine) and mixtures thereof.

Methods for forming the aforesaid amides are well known in the art. By way of illustration, methods and descriptions of such materials are given in U.S. Pat. Nos.: 2,015,912; 2,113,819; 2,151,241; and 2,728,759.

Typical of the fatty acid amides, for use in the compositions of this invention are the following:

1. saturated fatty acid amides of protein hydrolysates, ethanolamine salts, wherein the fatty acid group contains from 8 to 18 carbon atoms per molecule, and, of these, preference is given to $C_{12}$–$C_{14}$ acids; particularly triethanolamine salts;
2. alkali metal salts of the hydrolysates described directly above in (1), and particularly the potassium salts.

Particularly preferred herein is the triethanolamine salt of a cocoamide of a protein hydrolysate, wherein the coconut fatty acids are condensed with hydrolyzed protein amino acids.

Another preferred group of surface active agents are the cycloimidates represented by the formula:

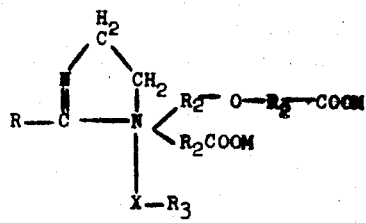

wherein
R is a hydrocarbon radical of 4–18 carbon atoms;
$R_2$ is selected from the class consisting of
 a. aliphatic hydrocarbon groups of 1–4 carbon atoms,
 b. hydroxy substituted hydrocarbon groups of 1–4 carbon atoms;
 c. aliphatic ether groups, each of said groups having a single ether linkage therein and otherwise being a hydro-single ether linkage therein and otherwise being a hydrocarbon of 2–4 carbon atoms,
 d. aliphatic ether groups, each of said groups having a single ether linkage therein and otherwise being a hydroxy substituted hydrocarbon of 2–4 carbon atoms, e. aliphatic keto groups, each of said groups having a single keto linkage therein and otherwise being a hydrocarbon of 2–4 carbon atoms, f. aliphatic keto groups, each of said groups having a single keto linkage therein and otherwise being a hydroxy substituted hydrocarbon of 2–4 carbon atoms;

$R_3$ is selected from the group consisting of hydrogen, aliphatic hydrocarbon radicals of 6–18 carbon atoms, aliphatic-aromatic hydrocarbon radicals with the aliphatic hydrocarbon being at least 6 carbon atoms, and fatty acid glyceride groups;

X is selected from the group of O, $SO_3$ and $OSO_3$; and M is an alkali metal.

Since cycloimidates and methods for their preparation are described in U.S. Pat. Nos. 2,773,068; 2,781,354 and 2,781,357, it is considered unnecessary to describe them again in detail herein. Reference is made to said patents for details in the preparation and composition of cycloimidates. It is to be understood, of course, that one or a plurality of the cycloimidates represented by the above formula can be used in the compositions of this invention. By way of illustration, the following cycloimidates are typical of those which may be used herein:

1. The disodium salt of 2-lauryl-cycloimidium-1-ethoxyethanoic acid-1-ethanoic acid-1-lauryl sulfate,
2. the disodium salt of 2-lauryl-cycloimidium-1-ethoxyethanoic -2-hydroxy-2-ethanoic acid,
3. the disodium salt of 2-lauryl-cyclomidium-1-ethoxyethanoic acid-1-ethanoic acid-1-cocomonoglyceride sulfate. Particularly preferred herein, however, are compounds (1) and (2) listed directly above.

Another preferred class of surface active agents are the alkylol amides, which also function as foaming agents. Representative of amides useful herein are the following: capric, caproic, lauric, myristic, mono- and di-ethanolamides; coco mono- and di-ethanolamides; ethoxylated amides e.g. in which 2 to 6 ethylene oxide groups are in the polyethoxy portion; etc. It is to be understood that the acid portion or the acid used in forming the amide, will contain at least about 6 carbon atoms per molecule.

Where reference is made to a "coco" compound, the term "coco" refers to fatty acid groups found in coconut oil fatty acids. Such acids contain from 8 to 18 carbon atoms per molecule, predominating in $C_{12}$–$C_{14}$ acids.

Other non-irritating surface active agents which may be suitably included in the compositions of the present invention with the foregoing preferred groups of surface active active agents are in the following listings and examples.

Among the anionic compounds that may be used are the aliphatic sulfated or sulfonated detergents. Suitable examples of the aliphatic detergents are the sulfuric acid esters of polyhydric alcohols incompletely esterified with higher fatty acids, either saturated or unsaturated, particularly those whose acyl groups contain from 12 to 18 carbon atoms, e.g., coconut oil monoglyceride monosulfate, tallow diglyceride monosulfate, lauroyl monoglyceride monosulfate; the long chain pure or mixed higher alkyl sulfates, e.g., lauryl sulfate, cetyl sulfate, higher fatty alcohol sulfates derived from hydrogenated or non-hydrogenated coconut oil or tallow fatty acids; the higher fatty acid esters of hydroxy alkyl sulfonic acids; higher fatty acid amides of amino alkyl sulfonic acids, e.g., the oleic acid amide of amino methyl sufonic acid, the lauric acid amide of taurine, and the like.

Other appropriate aliphatic sulf(on)ates include fatty sulfoacetates, e.g., coconut fatty alcohol sulfoacetates; sulfated fatty acyl monoethanolamides, e.g., sulfated lauroyl monoethanolamide; fatty sulfoacetamides, e.g., lauryl sulfoacetamide; lower alkyl sulfosuccinates, e.g., dioctyl sulfosuccinate, sulf(on)ated fatty oils such as sulf(on)ated castor oil and sulf(on)ated red oil, and lower alkyl esters of alphasulfonated higher fatty acids, e.g., methyl ester of alphasulfo myristic acid, sodium salt.

Synthetic detergents having a carboxylate group, and particularly the higher fatty acid amides of aliphatic amino acid compounds may also be included. A feature is the higher fatty acyl sarcosinate having about 10 to 18 carbons, usually 12–14 carbons, in the acyl radical, preferably the water-soluble salts of N-lauroyl or N-cocoyl sarcosine. Other materials are the higher fatty acid amides of polypeptide amino acids obtained by protein hydrolysis. Other suitable detergents with carboxylate groups are various cationic and amphoteric detergents described hereinafter. Suitable ether-containing sulfates may be used also such as the alkylphenol polyglycol ether sulfates, e.g., lauryl phenol polyethyleneoxy sulfates; and alkyl polyglycol ether sulfates, e.g., lauryl ethyleneoxy sulfates, each containing about 10 to 18 carbons in said alkyl groups and averaging about 2 to 10 moles of ethylene oxide, usually 3–4 moles, per molecule.

These various anionic detergents are used in the form of their water soluble or water dispersible salts such as the amine, alkali metal and alkaline earth metal salts. Examples are the sodium, potassium, magnesium salts and the like. It is generally preferred to use the ammonium and amine (including alkylolamine) salts where greater solubility in aqueous media is desired such as the ammonium, monethanolamine, diethanolamine, triethanolamine salts and mixtures thereof.

Other anionic detergents which may be employed also include water-soluble alkyl phosphates and soaps such as the sodium, potassium and triethanolamine soaps of fatty acids containing 12 to 18 carbons as well as mixtures of such soaps. Examples are sodium laurate, sodium palmitate, sodium oleate and the potassium and/or triethanolamine soaps of coconut oil, palm oil, and tallow fatty acids.

Further suitable organic detergents include non-ionic detergents such as the lower alkylene oxide condensation products of hydrophobic compounds, e.g., ethylene oxide condensates with higher fatty acids, higher fatty acid amides, higher fatty alcohols or alkyl aryl hydrocarbons, having at least 5 and usually from about 5 to 30 ethyleneoxy groups per molecule. The corresponding higher alkyl mercaptans of thioalcohols, or polyoxypropylene glycols of at least 900 molecular weight condensed with a sufficient number of ethylene oxide groups as known in the art may be used also. Other non-ionics are the alkylolamine condensates of higher fatty acids such as lauric and myristic diethanolamide, coconut fatty acid diethanolamide, and the like.

Cationic detergents wherein a quaternary nitrogen is part of an open chain or heterocyclic structure may also be used alone or in combination with other compatible detergents. Suitable salts are the chloride, bromide, acetate, sulfate, methsulfate and the like. Examples are lauroyl pyridinium bromide, N (lauroyl colamino formylmethyl) pyridinium chloride, cetyl trimethyl ammonium chloride, cetyl pyridinium chloride, stearyl or oleyl dimethylbenzylammonium chloride, stearyl amine acetate, stearyl dimethyl amine hydrochloride.

Other suitable surface-active agents which can under certain conditions have a cationic sature and which may be used include the higher alkyl amine oxides such as lauryl dimethyl amine oxide. In place of the lauryl radical, other long chain alkyl radicals, preferable having 10 to 18 carbon atoms, may be used also. In place of either or both methyl radicals, there may be other lower alkyl or hydroxyalkyl radicals such as having two carbon atoms each. Suitable examples include a mixture of higher alkyl dimethyl amine oxides having essentially about 12-14 carbons in the higher alkyl groups.

Any of the usual amphoteric (ampholytic) detersive materials may be employed in the compositions of the present invention. Among those are fatty or higher alkyl imidazolines, such as 1-coco-5-hydroxyethyl-5 carboxymethyl imidazoline; and the higher alkyl beta-alanines such as dodecyl beta-alanine, said materials having usually an alkyl group of 10 to 18 carbons and the carboxylate group being in the form of the water-soluble salt. Further examples are the disodium salt of lauroyl-cycloimidium-1-ethoxyethionic acid-2-ethanoic acid and its corresponding lauryl sulfate derivative.

Detergents having an intermediate linkage between the hydrophobic aliphatic hydrocarbon group and the water-solubilizing sulfate, sulfonate or carboxylate group are desirable components since such materials are considered to be relatively mild and non-irritating to the skin. Such intermediate linkages are amide, ether, polyether, ester and amine groups, as illustrated by the sarcosinates, imidazolines and the like materials.

It has been found that the addition of a small amount of silicone liquid about 0.1–5.0 percent by weight of the solids content and preferably about 0.1–2 percent by weight of the aqueous lotion, adds slip to the composition and assists the starch in forming a continuous film on the skin including all the creases thereof. The silicone liquid is a poly-organosiloxane including polyalkyl siloxanes such as poly dimethyl siloxane, polydiethylsiloxane, and poly-alkyl-aryl siloxanes such as polydimethyl-phenyl siloxane, and homologues thereof, in varying centistoke viscosities. Specific examples of the silicone fluid (siloxanes) may be represented by the formula:

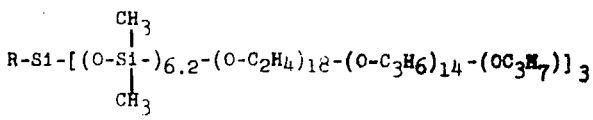

wherein R is a methyl or ethyl group.

The starch bath lotion soap compositions of the present invention are stable, homogeneous, pourable, aqueous suspensions which contain about 0.1–5 percent by weight of the solid content and preferably 0.4–2 percent by weight of the aqueous lotion of a stabilizing or suspending agent selected from the class consisting of silicon dioxide (finely divided, preferably having a particle size of 0.015–0.020 micron), and carboxyvinyl polymer acids (which are disclosed in U.S. Pat. No. 2,798,053.), and mixtures thereof. The polymers disclosed therein are compositions comprising a cross-linked interpolymer of (a) a mono-olefinic monomeric material comprising at least 25 percent by weight of a monomeric olefinically-unsaturated carboxylic acid containing at least one activated carbon to carbon double bond such as acrylic acid, and (b) from about 0.01 to about 10 percent by weight of a polyunsaturated crosslinking agent containing a plurality of polymerizable vinyl or crotyl groups such as a polyalkenyl polyether of a polyhydric alcohol. More particularly, the preferred interpolymers are derived from a mixture of acrylic acid and a polyether of sucrose in which the hydroxyl groups which are modified are etherified with at least two allyl groups per sucrose molecule. A specific material thereof contains about 97.5 to 99.8 percent by weight of acrylic acid and about 2.5 to 0.2 percent by weight of a monomeric polyether of sucrose in which the hydroxyls are etherified with at least two, and preferably about five to about six allyl groups per sucrose molecules. The carboxyvinyl polymer acids act as foam stabilizers as well as suspension stabilizers.

The term "pourable" as used herein refers to the ability of the product to flow as a liquid from a container at normal room temperature, (e.g. about 20°C. to 25°C.). The liquid product may be of variable viscosity. It may be highly fluid and freeflowing, or fairly viscous when at rest but pourable from the container upon light shaking. The liquid may be packaged in any suitable container, such as metal, glass or plastic in the form of bottles, cans, drums, packets or bags. When the lotion is fairly viscous, it is preferable to package the composition in a squeeze bottle to facilitate dispensing of said lotion. The term "homogeneous" as used herein means that the product has a satisfactory degree of stability during storage life against separation or formation of a plurality of distinct layers which either cannot be re-dispersed by light shaking or which separate rapidly after shaking. Such compositions include liquids which are opaque and off-white to tan in color depending upon the type and proportions of the various solids present therein. It has been found that the solid content can be varied between about 30–60 percent by weight of the composition, the balance of the liquid content being primarily water. Any solid material present in the composition in excess of its solubility in the particular system is maintained in a non-caking suspension. It is characteristic that in such cases, upon light shaking, the product is readily converted to a substantially homogeneous liquid which is stable for a sufficient period of time, e.g., at least about 1 hour, so that each small portion used as a lotion or added to a bath will have practically the same composition.

The aqueous starch bath suspension is prepared in any suitable manner. The warm, ungelled starch is preferably added to and thoroughly mixed with the aqueous dispersion containing the detergents, stabilizer, and silicone. The pH of the composition is preferably maintained at about pH 4 to 6 to coincide with the normal physiological pH of the skin. Suitable buffering agents include hydrochloric acid, citric acid, boric acid, etc.

The following specific examples are further illustrative of the nature of the present invention, and it is to be understood that the invention is not limited thereto.

Example I

| Ingredients | % by Weight |
|---|---|
| Triethanolamine salt of a cocoamide of hydrolyzed protein amino acids. | 12.50 |
| The disodium salt of 2-lauryl-cycloimidium-1-ethoxy-ethanoic acid-1-ethanoic acid-1-lauryl sulfate | 12.50 |
| Starch | 22.50 |
| Lauric Diethanolamide | 3.00 |
| Carboxyvinyl polymer acid[1] | 1.00 |
| Lauryldimethylamine Oxide | 1.00 |
| 5,4' dibromo-and 3,5,4' tribromosalicylamide | 0.20 |
| Dimethylpolysiloxane (100 cps viscosity) | 0.50 |
| Silicon dioxide (.015–.020 micron) | 1.00 |
| Polyethylene glycol having a molecular weight of 400 | 0.25 |
| Perfume | 0.20 |
| Water, q.s. to make | 100.00 |

[1] Co-polymer of about 99% by weight of glacial acrylic acid and about 1% by weight of polyallyl sucrose in which the sucrose molecule has an average of about 5–6 allyl groups.

The carboxyvinyl polymer acid is dispersed in water, to which are added the detergents, the cyclomidate, cocoamide, and lauric diethanolamide. The starch is added to the carboxyvinyl polymer acid detergent dispersion and thoroughly mixed therewith. The polyethylene glycol and the salicylamide are preferably dissolved in the lauric diethanolamide prior to its addition to the aqueous carboxyvinyl polymer acid dispersion. The dimethyl polysiloxane may be added to the above aqueous dispersion either prior to or after the addition of the starch. The other ingredients such as the perfume, silicon dioxide may be added at any time.

The resultant composition has a pH of 6.2 and is a substantially stable, homogeneous liquid.

EXAMPLES II – VII

| Ingredients | II | III | IV | V | VI | VII |
|---|---|---|---|---|---|---|
| Triethanolamine salt of cocoamide of hydrolyzed protein amino acids | 14.0%/W | 14.0% | 14.0% | 14.0% | 14.0% | 20.0% |
| Disodium salt of 2-lauryl-cycloimidium-1-ethoxy-ethanoic acid-1-ethanoic acid-1-lauryl sulfate | 14.0 | 14.0 | 14.0 | 14.0 | 14.0 | 20.0 |
| Starch | 22.5 | 22.5 | 20.0 | 20.0 | 20.0 | 20.0 |
| Carboxyvinyl polymer acids | 00.9 | 00.9 | 00.9 | 00.7 | 00.4 | 00.7 |
| Dimethyl polysiloxane | 00.5 | — | 00.1 | 00.1 | 00.1 | 00.1 |
| Lauryl dimethyl amine oxide | 1.00 | 1.00 | 1.00 | 1.00 | 1.00 | 2.00 |
| Lauric myristic diethanolamide | 2.00 | 2.00 | 4.00 | 4.00 | 4.00 | 2.00 |
| Perfume | 0.15 | 0.15 | 0.20 | 0.20 | 0.20 | 0.20 |
| Water | q.s. | q.s. | q.s. | q.s. | q.s. | q.s. |
| pH | 5.50 | 5.45 | 5.60 | 5.90 | 6.50 | 6.10 |

Satisfactory starch lotions are produced from above formulations II–VII, however, Example II has been found to be superior as to stability.

EXAMPLE VIII

| Ingredients | % by Weight | Grams |
|---|---|---|
| Disodium salt of 2-lauryl-cycloimidium-1-ethoxyethanoic acid-1-ethanoic acid-1-lauryl sulfate | 20.0 | 40.0 |
| Triethanolamine salt of cocoamide of a protein hydrolysate | 20.0 | 40.0 |
| Perfume | 00.2 | 00.4 |
| Dimethyl polysiloxane | 00.1 | 00.2 |

EXAMPLE V – Continued

| Ingredients | % by Weight | Grams |
|---|---|---|
| Lauryl dimethyl amine oxide | 2.00 | 13.5g of 30% |
| Lauric diethanolamide | 2.00 | 4.0 |
| 5,4'dibromo – 3,5,4'tribromosalicyl amide | 00.2 | 00.4 |
| Polyethylene glycol (M.W. 400) | 00.5 | 1.0 |
| Starch | 20.0 | 40.0 |
| Silicon dioxide (finely divided) | 1.00 | 02.0 |
| Water q.s. | 100.00 | 200.00 |

The resultant composition has a pH of 7. The pH is adjusted to pH 5.1 by the addition of 9 ml. of 1N Hydrochloric Acid.

EXAMPLES IX – X

| Ingredients | IX | X |
|---|---|---|
| Disodium salt of 2-lauryl-cycloimidium-1-ethoxyethanoic acid-1-ethanoic acid-1-lauryl sulfate | 20.0%/W | 20.0% |
| Triethanolamine salt of cocoamide of protein hydrolysate | 20.0 | 20.0 |
| Carboxyvinyl polymer acids | 00.2 | 00.2 |
| Lauric myristic diethanolamide | 02.0 | 02.0 |
| Cornstarch | 20.0 | 20.0 |
| SiO₂ (finely divided) | — | 00.2 |
| 5,4'dibromo – 3,5,4'tribromosalicylamide | 00.1 | 00.1 |
| Water | 100.0 | 100.0 |

The SiO$_2$ is blended with the starch prior to its addition to the aqueous dispersion of detergents and carboxyvinyl polymer acids. Both formulations produced satisfactory pourable lotions, which had a tendency to settle, thereby requiring shaking prior to utilization. The addition of more carboxyvinyl polymer acids would overcome this settling problem.

EXAMPLE XI

| Ingredients | % by Weight |
|---|---|
| Carboxyvinyl polymer acids | 00.2 |
| Water | 34.8 |
| Corn Starch | 22.5 |
| Disodium salt of 2-lauryl-cycloimidium-1-ethoxyethanoic acid-1-ethanoic acid-1-lauryl sulfate | 20.0 |
| Triethanolamine salt of cocoamide of a protein hydrolysate | 20.0 |
| Lauric myristic diethanolamide | 02.0 |
| Silicon dioxide | 00.5 |

Carboxyvinyl polymer acid is dispersed in water and the starch added thereto. The cocoamide and the cycloimidate are added to and mixed with the aqueous carboxyvinyl polymer acidstarch dispersion. Lauric myristic diethanol amide is added to the above and stirred until the viscosity of the composition is increased. A noticeable thickening is observed but no settling or separation. The pH of this formulation is 6.4–6.6. The addition of 1.5 ml. of 1N Hydrochloric Acid to 20 grams of the above formulation reduces the pH to 5 and breaks up the carboxyvinyl polymer acid gel which caused the thickening of the dispersion.

EXAMPLES XII – XIV

| Ingredients | XII | XIII | XIV |
|---|---|---|---|
| Triethanolamine salt of cocoamide of a protein hydrolsate | 12.50% | 12.50% | 14.00% |
| Disodium salt of 2-lauryl-cycloimidium-1-ethoxyethanoic acid-1-ethanoic acid-1-lauryl sulfate | 12.50 | 12.50 | 14.00 |
| Corn Starch | 22.50 | 22.50 | 20.00 |
| Lauric myristic diethanolamide | — | 02.00 | 02.00 |
| Carboxyvinyl polymer acid | 01.00 | 01.00 | 01.40 |
| Perfume | 00.20 | 00.20 | 00.20 |
| Dimethyl polysiloxane | 00.50 | 00.50 | 00.50 |
| Lauryl dimethyl amine oxide | 00.75 | 00.75 | 00.75 |
| Water | q.s. | q.s. | q.s. |
| pH | 04.80 | 04.90 | 04.60 |

The above lotions exhibited no separation into layers, but rather a stable, homogeneous, pourable liquid.

EXAMPLE XV

| Ingredients | % by Weight |
|---|---|
| Triethanolamine salt of cocoamide of a protein hydrolysate | 12.50 |
| Disodium salt of 2-lauryl-cycloimidium-1-ethoxyethanoic acid-1-ethanoic acid-1-lauryl sulfate | 12.50 |
| Carboxyvinyl polymer acid | 01.00 |
| Water | 45.35 |
| 5,4′dibromo – 3,5,4′tribromosalicylamide | 00.25 |
| Polyethylene glycol (M.W. 400) | 00.25 |
| Lauric diethanolamide | 03.00 |
| Lauryl dimethyl amine oxide | 01.00 (active) |
| Dimethyl polysiloxane (100 cps.) | 01.00 |
| Silicon dioxide | 01.00 |
| Corn Starch | 22.50 |

The carboxyvinyl polymer acid is dispersed in water at 75°–80°C., to which is added the cocoamide and cycloimidate. The salicylamide is dispersed in the polyethylene glycol. Lauric diethanolamide is added to the polyethylene glycol mixture, heated and agitated until it is clear. The lauryl dimethyl amine oxide and dimethyl polysiloxane liquid is added to the polyethylene glycol mixture and agitated until clear, at which time it is added to carboxyvinyl polymer acid-cocoamide-cycloimidate dispersion. This mixture is cooled to room temperature and the starch which has been blended with the silicon dioxide is added thereto and agitated until a homogeneous suspension is formed.

Although the present invention has been described with reference to particular embodiments and examples, it will be apparent to those skilled in the art that variations and modifications of this invention can be made and that equivalents can be substituted, therefore, without departing from the principles and true spirit of the invention.

We claim:

1. A stable, homogeneous aqueous starch lotion for simultaneous cleansing of the skin and depositing a protective starch film on the skin, consisting essentially of from about 5 to about 40 percent by weight of starch from about 10 to about 90 percent by weight of non-irritating detergents selected from the group consisting of
    a. fatty acid amides of hydrolyzed protein amino acids represented by the formula:

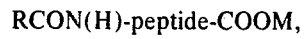

wherein R is an alkyl radical containing from 8 to 18 carbon atoms, and M is a cation selected from the class consisting of ammonium, magnesium, alkali metal, monoethanolamine, diethanolamine and triethanolamine.
    b. cycloimidates represented by the formula:

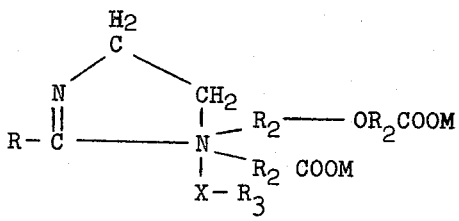

wherein R is a hydrocarbon radical of 4 to 18 carbon atoms; $R_2$ is selected from the group consisting of an aliphatic hydrocarbon of 1 to 4 carbon atoms, a hydroxy substituted hydrocarbon of 1 to 4 carbon atoms, an aliphatic ether of 2 to 4 carbon atoms, a hydroxy substituted aliphatic ether of 2 to 4 carbon atoms, an aliphatic keto of 2 to 4 carbon atoms and a hydroxy substituted aliphatic keto of 2 to 4 carbon atoms; $R_3$ is selected from the group consisting of hydrogen, an aliphatic hydrocarbon radical of 6 to 18 carbon atoms, an aliphatic-aromatic hydrocarbon radical with the aliphatic hydrocarbon being at least 6 carbon atoms, and a fatty acid glyceride; X is selected from the group consisting of O, $SO_3$, and $OSO_3$; and M is an alkali metal,
    c. alkylolamides selected from the group consisting of monoethanolamide, diethanolamide and an ethoxylated amide of a fatty acid wherein the acid portion contains at least 6 carbon atoms and mixtures thereof, and
    d. mixtures of (a)–(c),
and from about 0.1 to about 5% of a non-toxic stabilizing agent selected from the group consisting of a) silicon dioxide and b) a polymer consisting essentially of about 97.5 to 99.8 percent by weight of acrylic acid and about 2.5 to 0.2 percent by weight of a monomeric polyether of sucrose in which the hydroxyls are etherified with 2 to 6 allyl groups per sucrose molecule, said aqueous lotion having a pH of 4 to 6.

2. A lotion in accordance with claim 1 wherein detergent (b) is a disodium salt of 2-lauryl-cycloimidium-1-ethoxyethanoic acid-1-ethanoic acid-1-lauryl sulfate.

3. A lotion in accordance with claim 1 wherein detergent (a) is a triethanalamine salt of cocoamide of hydrolyzed protein amino acids.

4. A lotion in accordance with claim 1 wherein the cycloimidate is the disodium salt of 2-lauryl-cycloimidium-1-ethoxyethanoic acid-1-ethanoic acid-1-cocomonoglyceride sulfate.

5. A lotion in accordance with claim 1 which also contains about 0.1–5 percent by weight of the solid content of a polyorganosiloxane selected from the group consisting of polydimethylsiloxane, polydiethylsiloxane and polydimethylphenylsiloxane.

6. A lotion in accordance with claim 5 wherein the polyorganosiloxane is dimethyl polysiloxane.

7. A stable, homogeneous aqueous starch lotion for simultaneous cleansing of the skin and depositing a protective starch film on the skin, consisting essentially of from about 20 to 25 percent by weight of starch selected from the group consisting of corn starch, wheat starch, potato starch, formaldehyde-treated starch and epichlorohydrin-treated starch, 20 to 60 percent by weight of a detergent consisting essentially of a mixture of triethanolamine salt of cocoamide of a protein hydrolysate, disodium salt of 2-lauryl-cycloimidium-1-ethyoxyethanoic acid-1-ethanoic acid-1-lauryl sulfate, and lauric myristic diethanolamide, 0.4 to 2 percent by weight of silicon dioxide and 0.4 to 2 percent by weight of a polymer consisting essentially of about 97.5 to 99.8 percent by weight of acrylic acid and 2.5 to 0.2 percent by weight of a monomeric polyether of sucrose in which the hydroxyls are etherified with five to six allyl groups per sucrose molecule; said aqueous lotion having a pH of 4 to 6.

8. A lotion in accordance with claim 7 wherein the starch is corn starch which is present in an amount of 22.5 percent, the triethanolamide salt of a cocoamide of a protein hydrolysate is present in an amount of 20 percent, the disodium salt of 2-lauryl-cycloimidium-1-ethoxyethanoic acid-1-ethanoic acid-1-lauryl sulfate is present in an amount of 20 percent, the lauric myristic diethanolamide is present in an amount of 2 percent, the silicon dioxide is present in an amount of 0.5 percent, said polymer is present in an amount of 0.2% and the balance of the lotion is water.

9. A stable, homogeneous aqueous starch lotion for simultaneous cleansing of the skin and depositing a protective starch film on the skin, consisting essentially of 22.5 percent by weight of corn starch, 14.0 percent by weight of triethanolamine salt of cocoamide of hydrolyzed protein amino acids, 14.0 percent by weight of disodium salt of 2-lauryl-cycloimidium-1-ethoxyethanoic acid-1-ethanoic acid-1-lauryl sulfate, 0.9 percent by weight of a polymer consisting essentially of about 97.5 to 99.8 percent by weight of acrylic acid and about 2.5 to 0.2 percent by weight of a monomeric polyether of sucrose in which the hydroxyls are etherified with 5 to 6 allyl groups per sucrose molecule, 0.5 percent by weight of dimethyl polysiloxane, 1.0 percent by weight of lauryl dimethyl amine oxide, 2.0 percent by weight of lauric myristic diethanolamide, and the balance of the lotion is water; said lotion having a pH of 5.5.

* * * * *